(12) United States Patent
Lim et al.

(10) Patent No.: US 9,749,587 B2
(45) Date of Patent: Aug. 29, 2017

(54) METHOD AND APPARATUS FOR GENERATING COMBINED VIDEO STREAM FOR MULTIPLE IMAGES

(71) Applicants: SK TELECOM CO., LTD., Seoul (KR); PIXTREE, INC., Seoul (KR)

(72) Inventors: Jeong-yeon Lim, Seoul (KR); Dong-bum Seo, Seoul (KR); Jae-seob Shin, Seoul (KR); Se-hoon Son, Seoul (KR); Hyeong-duck Kim, Suwon-si (KR)

(73) Assignees: SK TELECOM CO., LTD., Seoul (KR); PIXTREE, INC., Seoul (KR)

( * ) Notice: Subject to any disclaimer, the term of this patent is extended or adjusted under 35 U.S.C. 154(b) by 0 days.

(21) Appl. No.: 15/163,644

(22) Filed: May 24, 2016

(65) Prior Publication Data
US 2016/0269684 A1    Sep. 15, 2016

Related U.S. Application Data

(63) Continuation of application No. PCT/KR2015/000090, filed on Jan. 6, 2015.

(30) Foreign Application Priority Data

Jan. 6, 2014 (KR) .................. 10-2014-0001447
Oct. 29, 2014 (KR) .................. 10-2014-0147846

(51) Int. Cl.
*H04N 7/15* (2006.01)
*H04N 7/14* (2006.01)

(52) U.S. Cl.
CPC .............. *H04N 7/15* (2013.01); *H04N 7/147* (2013.01); *H04N 7/152* (2013.01)

(58) Field of Classification Search
None
See application file for complete search history.

(56) References Cited

U.S. PATENT DOCUMENTS

2010/0302446 A1* 12/2010 Mauchly ............... H04N 7/147
  348/598
2011/0160882 A1* 6/2011 Gupta ............... H04N 21/4131
  700/94

(Continued)

FOREIGN PATENT DOCUMENTS

KR    1020010012645 A    2/2001
KR    1020020014770 A    2/2002

(Continued)

OTHER PUBLICATIONS

International Search Report mailed Feb. 23, 2015 corresponding to International Application No. PCT/KR2015/000090.

*Primary Examiner* — Creighton Smith
(74) *Attorney, Agent, or Firm* — Hauptman Ham, LLP (57) ABSTRACT

An apparatus of generating a combined video stream of multiple images, includes: an image acquiring unit to acquire a plurality of individual video streams transmitted over multiple channels; an image information extracting unit to extract individual image codes and individual header information from each of the plurality of the individual video streams; and a bit stream generating unit to generate combined image codes by inserting individual image codes into corresponding respective positions corresponding to each of the plurality of individual video streams in a predetermined layout of a display picture, generate combined header information corresponding to the combined image codes based on respective individual header information, and generate a combined video stream including the combined image codes and the combined header information.

19 Claims, 6 Drawing Sheets

(56) References Cited

U.S. PATENT DOCUMENTS

| | | | | |
|---|---|---|---|---|
| 2012/0023442 | A1* | 1/2012 | Oshiro | G06F 3/0481 |
| | | | | 715/788 |
| 2014/0072030 | A1* | 3/2014 | Zhou | H04N 19/119 |
| | | | | 375/240.02 |
| 2014/0192899 | A1* | 7/2014 | Wang | H04N 19/70 |
| | | | | 375/240.26 |
| 2014/0247876 | A1* | 9/2014 | Moriya | H04N 19/00951 |
| | | | | 375/240.12 |
| 2014/0328413 | A1* | 11/2014 | Esenlik | H04N 19/197 |
| | | | | 375/240.29 |
| 2015/0016503 | A1* | 1/2015 | Rapaka | H04N 19/70 |
| | | | | 375/240.02 |
| 2015/0058730 | A1* | 2/2015 | Dubin | G06F 17/30044 |
| | | | | 715/719 |
| 2015/0222928 | A1* | 8/2015 | Tian | H04N 21/2365 |
| | | | | 375/240.16 |
| 2015/0381936 | A1* | 12/2015 | Goyal | H04N 7/15 |
| | | | | 348/14.06 |
| 2016/0353120 | A1* | 12/2016 | Deshpande | H04N 19/70 |
| 2016/0378110 | A1* | 12/2016 | Phillips | G05D 1/0033 |
| | | | | 701/2 |

FOREIGN PATENT DOCUMENTS

| | | |
|---|---|---|
| KR | 1020020026169 A | 4/2002 |
| KR | 1020050032113 A | 4/2005 |

* cited by examiner

METHOD AND APPARATUS FOR GENERATING COMBINED VIDEO STREAM FOR MULTIPLE IMAGES

CROSS-REFERENCE TO RELATED APPLICATIONS

The present application is a continuation of International Patent Application No. PCT/KR2015/000090, filed on Jan. 6, 2015, which is based upon and claims the benefit of priorities to Korean Patent Application No. 10-2014-0001447, filed on Jan. 6, 2014 and Korean Patent Application No. 10-2014-0147846, filed on Oct. 29, 2014. The disclosures of the above-listed applications are hereby incorporated by reference herein in their entirety.

TECHNICAL FIELD

Some embodiments of the present disclosure relate to a method and an apparatus for generating a single bit stream of multiple images.

BACKGROUND

The statements in this section merely provide background information related to the present disclosure and do not necessarily constitute prior art.

In a broadcasting service, image media contents can be transmitted for each channel of multi-channels. The inventor(s) has noted that a multi-channel service is to allow users (i.e., users' terminal devices or users' equipments) to watch four-channel images on one channel. The inventor(s) has further noted that a multi-view service is to allow users to selectively watch multi-angle images shot in such sports fields (or arena or stadiums) as, for example, a baseball, a football, and so on, enabling a simultaneous playback of a plurality of images by displaying the plurality of images at a time on a display device of a user terminal device, as is provided by an image sharing. The inventor(s) has noted that although such a service plays back video bit streams received from respective channels separately on the user terminal device, the user terminal device with insufficient resources allocated to receive and play back video images of a plurality of channels typically involves a transmitting terminal to mix and transmit the images of the plurality of channels on one channel (i.e., a single channel).

Further, in case of a video conference call or a video group call, images are received from each participant to layout the images suitably for each participant by using a mixing device in the form of hardware or software. The inventor(s) has noted that the encoded codes of the images are then transcoded (i.e., encoded after decoding) for transmission in the one channel. For example, in case where four users A, B, C and D participate in the video conference call or the video group call, user A receives a single image (e.g., integrated image to show other users B, C and D other than user A) with images of users B, C and D combined except for the user A's own image, while the user B receives a single combined image of users A, C and D except for the user B's own. The inventor(s) has noted that a CCTV control system also receives and combines multiple images captured from a plurality of cameras on a single screen of a display device of the CCTV control system in order to enable the multiple images to be monitored unitarily on the single screen.

Further, in the process of optimizing the bit streams by adjusting the bit rates of the bit streams for multi-channel input images, the images can be encoded or transcoded by setting region of interest (ROI) for the entire image or a specific image. However, the inventor(s) has experienced that the location of the ROI is fixed, which requires the entire image to be transcoded and this is true even with the ROI relocated for the transcoding.

The inventor(s) has experienced that in such a video conference call or video group call, a transcoding is needed to decode the delivered image as having been encoded and then encode it back. Thus, the inventor(s) has experienced that not only the quality of the image is likely to decrease, but the entire coding time is delayed by the transcoding, which causes a delay of the display time.

SUMMARY

In accordance with some embodiments of the present disclosure, an apparatus of generating a combined video stream of multiple images includes an image acquiring unit, an image information extracting unit and a bit stream generating unit. The image acquiring unit is configured to acquire a plurality of individual video streams transmitted over multiple channels. The image information extracting unit is configured to extract individual image codes and individual header information from each of the plurality of the individual video streams. And the bit stream generating unit is configured to generate combined image codes by inserting individual image codes into corresponding respective positions corresponding to each of the plurality of individual video streams in a predetermined layout of display picture, to generate combined header information corresponding to the combined image codes based on respective individual header information, and to generate a combined video stream including the combined image codes and the combined header information.

In accordance with some embodiments of the present disclosure, a method performed by an apparatus of generating a combined video stream of multiple images includes acquiring a plurality of individual video streams transmitted over multiple channels, extracting individual image codes and individual header information from each of the plurality of the individual video streams, generating combined image codes by inserting individual image codes into corresponding respective positions corresponding to each of the plurality of individual video streams in a predetermined layout of display picture, generating combined header information corresponding to the combined image codes based on respective individual header information, and generating a combined video stream including the combined image codes and the combined header information.

DETAILED DESCRIPTION

Hereinafter, at least one embodiment of the present disclosure will be described in detail with reference to the accompanying drawings.

To aid in understanding of the present disclosure, the terms used in the following description are defined as follows. It will be understood that the terms "comprises" and/or "comprising," or "includes" and/or "including" when used in this specification, specify the presence of stated components, but do not preclude the presence or addition of one or more other components. The terms such as "unit", "module", and the like refer to units for processing at least one function or operation, which may be implemented by hardware, software, or a combination thereof. Additionally, in describing the components of the present disclosure, there are terms used like first, second, A, B, (a), and (b). These are solely for the purpose of differentiating one component from the other but not to imply or suggest the substances, order or sequence of the components. If a component were described as 'connected', 'coupled', or 'linked' to another component, they mean the components are not only directly 'connected', 'coupled', or 'linked' but also are indirectly 'connected', 'coupled', or 'linked' via a third component. The terms, such as "first" and "second," are used to describe various elements. The terms are merely used to distinguish one element from other elements, but are not used to limit the elements. Throughout the drawings, like numerals refer to portions that perform similar functions and exert similar effects, and duplicate descriptions of the portions will be omitted.

Some embodiments of the present disclosure provide a method and an apparatus for generating a single bit stream of multiple images, when receiving bit streams of a plurality of input images through multiple channels, so as to provide a single combined screen of the bit streams and information updated for indicating headers of the respective bit streams without performing a transcoding.

Figure 1:
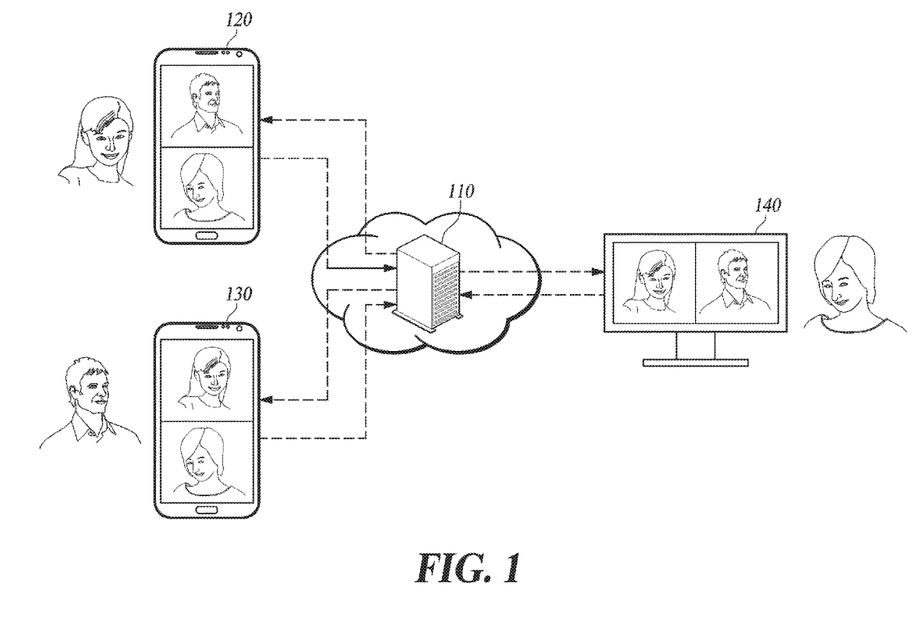
FIG. 1 is a schematic diagram of an apparatus of generating a combined video stream of multiple images according to some embodiments of the present disclosure, being connected to user terminals via a network.

FIG. 1 is a schematic diagram of an apparatus of generating a combined video stream of multiple images according to some embodiments of the present disclosure, being connected to user terminals via a network. As shown in FIG. 1, an apparatus 110 of generating a single bit stream of multiple images according to some embodiments of the present disclosure is connected to a plurality of user terminal devices (hereinafter, referred to as "user terminal(s)" or terminal(s)) including a first user terminal 120, a second user terminal 130 and a third user terminal 140. The apparatus 110 of generating a single bit stream of multiple images includes all kinds of devices comprising one or more processors and/or application-specific integrated circuits (ASICs) specified for implementing respectively corresponding operations and functions described herein in the present disclosure. The apparatus 110 further comprises a communication module (not shown) to transmit and/or receive signals (e.g., instructions or controls to perform a generation of the single bit stream of the multiple images controlled by the processor(s) and/or the ASICs between the units (shown in FIG. 2) equipped in the apparatus 110) to and/or from the units of the apparatus, and communicate with one or more user terminals through wired/wireless communication networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The user terminal (i.e., each of the first to third user terminals 120 to 140) indicates, for example, hand-held mobile (or hand-carry, or portable) terminal device, a user equipment, and it is not limited thereto and includes all kinds of devices comprising one or more processors and/or application-specific integrated circuits (ASICs) specified for implementing respectively corresponding operations and functions described herein in the present disclosure. The user terminal also represents, for example, a personal computer (PC), a tablet PC, a notebook computer, a personal digital assistant (PDA), a game console, a portable multimedia player (PMP), a PlayStation Portable (PSP), a mobile communication terminal, a smart phone, a TV, a set-top box, a media player, and the like, and means various apparatuses including a communication device such as a communication modem that performs communication with the apparatus 110, or various devices through wired/wireless communication networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The apparatus 110 enables the first user terminal 120 to simultaneously display both an image (hereinafter, referred to as a "second image" for the purpose of convenience of explanation) captured by the second user terminal 130 and an image (hereinafter, referred to as a "third image" for the purpose of convenience of explanation) captured by the third user terminal 140 on a display panel of the first user terminal 120, and enables the second user terminal 130 to simultaneously display both an image (hereinafter, referred to as a "first image" for the purpose of convenience of explanation) captured by the first user terminal 120 and the image (i.e., the third image) captured by the third user terminal 140 on a display panel of the second user terminal 130. Similarly, the apparatus 110 enables the third user terminal 140 to simultaneously display images (i.e., the first image and the second image) each captured by the first user terminal 120 and the second user terminal 130 on a display panel of the third user terminal 140. The apparatus 110 is configured to display, on one of the first, second or third user terminals, bit streams of images inputted from the other user terminals without performing a transcoding.

The user terminal further comprises all the elements (not shown in FIG. 2) specified for implementing respectively corresponding operations and functions described herein in the present disclosure: for example, a video camera to capture images (for example, images of a user captured by the video camera during a video conference call or a video group call); a memory that stores various programs and data to encode images, and individual video stream to be generated for the captured images; a microprocessor (or processor) that executes programs specified to generate the individual video stream for the captured images, to perform calculation and control for generating the individual video stream by using various encoding schemes, and to add, into the generated individual video stream, information including individual image codes and individual header information; a keyboard or a touch screen for inputting numbers, characters, or texts and etc., as an input element; a display panel (such as, e.g., liquid crystal display (LCD), light-emitting diode (LED) and etc., as a input and/or output element to show images and the like.

The apparatus 110, as described above, obviates the needs for a transcoding, to simultaneously display on a single screen, the bit streams of a plurality of images provided by a plurality of camera outputs, VoDs, and the like by way of IPTV, terrestrial or cable TV, in-house broadcasting, internet broadcasting services, and the like.

Figure 2:
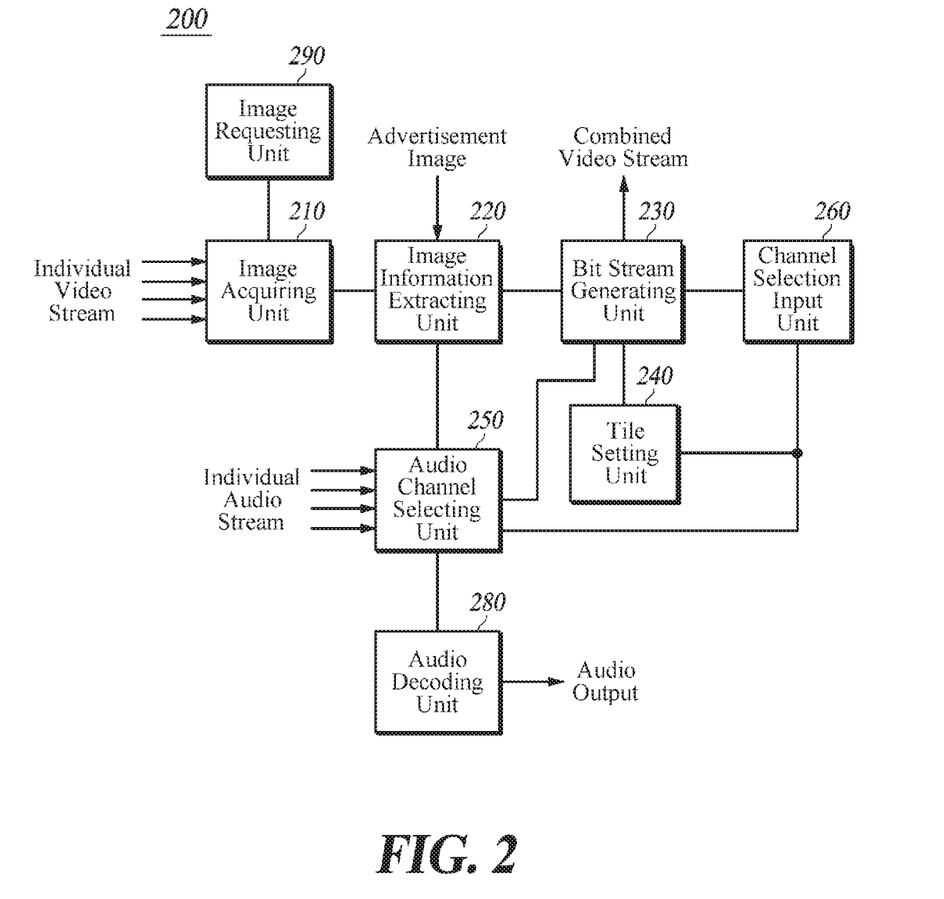
FIG. 2 is a block diagram of the apparatus of generating a combined video stream of multiple images according to some embodiments of the present disclosure.

FIG. 2 is a block diagram of the apparatus of generating a combined video stream of multiple images according to some embodiments of the present disclosure. As shown in FIG. 2, the single bit streaming apparatus 200 (i.e., corresponding to the apparatus 110 shown in FIG. 1) according to some embodiments of the present disclosure includes an image acquiring unit 210, an image information extracting unit 220, a bit stream generating unit 230, a tile setting unit 240, an audio channel selecting unit 250, a channel selection input unit 260, an audio decoding unit 280 and an image requesting unit 290. Each of the image acquiring unit 210, the image information extracting unit 220, the bit stream generating unit 230, the tile setting unit 240, the audio channel selecting unit 250, the channel selection input unit 260, the audio decoding unit 280 and the image requesting unit 290 is implemented by one or more processors and/or application-specific integrated circuits (ASICs) specified for implementing respectively corresponding operations and functions described herein in the present disclosure. Depending on embodiments, the single bit streaming apparatus 200 is configured to further include additional components to, or eliminate some from the image acquiring unit 210, the image information extracting unit 220, the bit stream generating unit 230, the tile setting unit 240, the audio channel selecting unit 250, the channel selection input unit 260, the audio decoding unit 280 and the image requesting unit 290.

The image acquiring unit 210 acquires a plurality of individual video streams, for example transmitted from each user terminal after capturing images, input via multiple channels. The plurality of individual video streams are generated by encoding respective images. The individual video stream has picture units each consisting of one or more slices, and each slice is configured to be consisting of one or more tiles. The individual video stream is generated by the processor(s) and/or ASICs of each user terminal, and transmitted by each user terminal over a corresponding channel of the multiple channels established in the wire/wireless communication networks.

The slice and tile are structured into a rectangular shape including, for example, a plurality of coding tree blocks (CTBs) and are adapted for encoding and decoding by the H.265 HEVC (High Efficiency Video Coding) standard. Each tile structure is a CTB matrix form, for example 3×3 CTB matrix form, but not limited thereto. Any other sizes of CTB matrix are possible.

The image information extracting unit 220 extracts the image information including individual image codes and individual header information from the respective individual video streams acquired by the image acquiring unit 210. The individual image code means NAL (Network Abstract Layer) having an actual video coding stream (VCL: Video Coding Layer), and the individual header information includes NVCL (Non Video Coding Layer) having header information, for example the number of slices, the number of tiles per slice, the size of each tile, the number of pixel samples in picture.

The bit stream generating unit 230 generates combined video stream by performing synchronization of a plurality of individual video streams based on a layout form that has been set for images displayed on a user terminal and image information extracted by the image information extracting unit 220. That is, the combined video stream is generated by integrating (combining) the plurality of individual video streams by synchronizing each of the plurality of individual video streams referring to the layout form and the extracted image information. The combined video stream is generated to be applicable to transmit it over a single channel. Herein, the combined video stream is generated, as an exemplary embodiment of the present disclosure, in a format of a single bit stream by combining the plurality of individual video streams transmitted from one or more user terminals over respective multiple channels. Specifically, upon receiving the respective individual image codes extracted from the image information extracting unit 220, the bit stream generating unit 230 inserts the respective individual image codes into corresponding positions assigned to each of the individual video streams in a predetermined layout of a plurality of encoded bit streams of images set to be codisplayed (i.e., simultaneously displayed) through a synchronization on a single screen, and then generates combined image codes with the individual image codes to simultaneously display the combined video stream on the single screen. That is, using the respective individual image codes, the bit stream generating unit 230 performs synchronization of the plurality of individual video streams by using the extracted respective individual image codes to thereby generate the combined video stream applicable to display the generated combined video stream on the single screen in such a manner where the bit stream generating unit 230 generates combined image codes by inserting the respective individual image codes into corresponding positions of the respective individual image codes in a predetermined layout to be displayed in the screen (i.e., a display panel of a user terminal).

The bit stream generating unit 230 generates combined header informations corresponding to the combined image codes based on respective individual header information, and then generates a combined video stream including the combined image codes and the combined header informations.

Here, the combined header information included in the generated combined video stream includes information indicating how many tiles are included in a display picture. Further, the combined header information includes information regarding the respective numbers of tiles in the transverse and height directions within the picture and information indicating the respective numbers of samples in the transverse and height directions of each tile. Further, each individual image code is reconstructed as an image code of a tile in a predetermined position.

Figure 3:
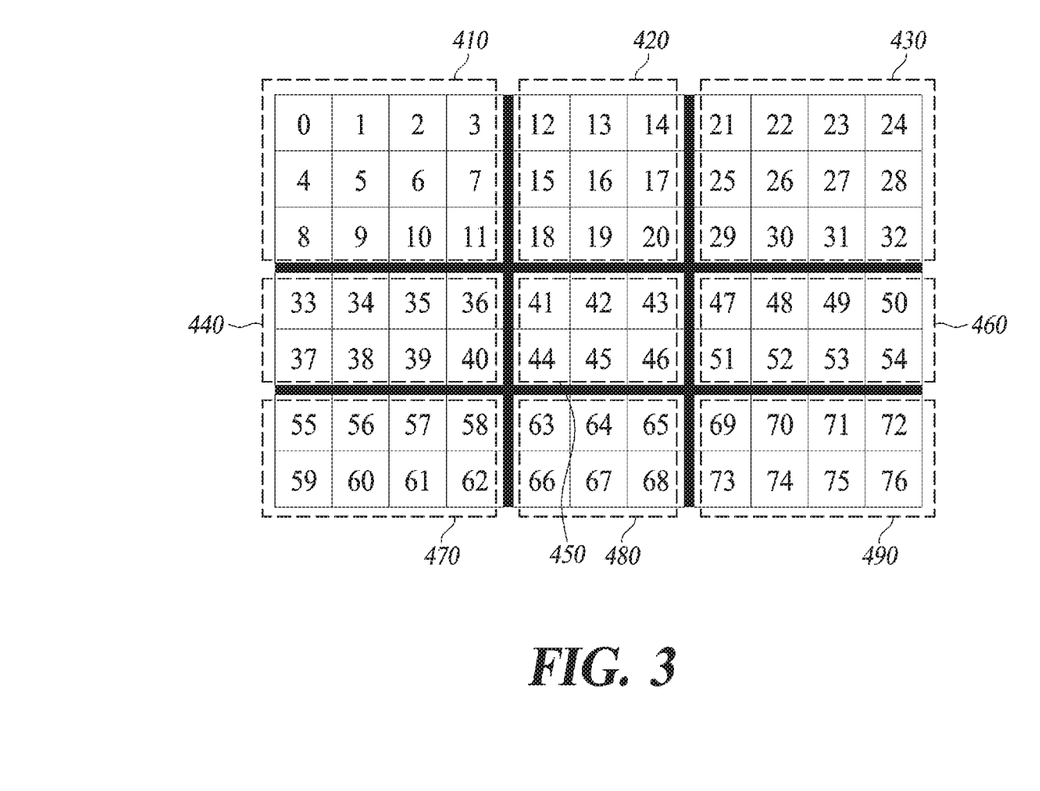
FIG. 3 is a schematic diagram of a display image divided into a 3×3 tile structure.

FIG. 3 is a schematic diagram of a display image divided into a 3×3 tile structure.

The number of tiles to be displayed on the screen to display a combined video stream are specified by a predetermined number of tiles. Such number of tiles is set to display a predetermined number of individual video streams in an interested terminal or in the single bitstream generation apparatus 110. In addition, the number of tiles is set by a user selection to be displayed on the screen for the combined video stream. Using a select device such an input device equipped in the user terminal as, for example, a keyboard, a keypad, a touch screen pad, and etc., the user selects individual images to be displayed to display corresponding selected video streams on one screen. This function of selecting the individual images to be displayed is performed by the channel selection input unit 260 that transmits the individual images to the bit stream generating unit 230.

The channel selection input unit 260 selects n channels of those available to be displayed on one screen.

As shown in FIG. 3, three tiles by three tiles are set in a display screen, and each tile has a plurality of CTBs. The CTB number of each tile is determined to be equal to the number of CTBs encoded in the individual video stream.

In FIG. 3, the number of samples in the width direction of any one of tiles is identical to the number of samples in the width direction of the tile adjacent vertically thereto. In addition, the number of samples in the height direction of any one of tiles is identical to the number of samples in the height direction of the tile adjacent horizontally thereto.

For example, the numbers of samples in the width direction of tiles 410, 440, and 470 are set to be the same. In addition, the numbers of samples in the height direction of tiles 410, 420, and 430 are set to be the same. In this setting, the tile structure of HEVC is applied.

The size of each tile to be displayed is set in a terminal to be displayed or the apparatus 110. Alternatively, the size of each tile to be displayed is set by a user with the select device.

In the apparatus 110, the tile setting unit 240 receives information on the number of tiles and the size of each tile specified as described above, and sets the number of tiles and the size of each tile to be displayed.

The bit stream generating unit 230 receives selection information regarding the configuration of the tile, and selects a screen configuration of a display picture including the selected n tiles.

When the bit stream generating unit 230 arranges the n tiles, each individual video stream is arranged in unit of I-frames, and then a screen of the display picture is configured by arranging the respective individual videos in unit of tiles. The I-frame units of arrangement are performed in the bit stream generating unit 230, or performed in a Demuxer (not shown) connected to the image acquiring unit 210. In the Demuxer, the each individual video stream is arranged equally in I-frame units on the time axis, and then the Demuxer corrects PTS (Presentation Time Stamp) values of a video and audio with STC (System Time Clock)-PCR (Program Clock Reference) values to synchronize each individual video and audio.

The bit streams of the respective channels have the same GoP (Group of Picture) structure.

The bit streams of the respective channels are arranged so that the frames are coaligned with one another in their order of arrangement in the GOP structure. For example, the bit streams in all the channels are orderly arranged on the basis of I-frame in the GOP structure, or B-frames, if any, are coaligned with one another in their order of arrangement in the GOP structure, or P-frames are similarly coaligned from channel to channel.

In the case that the GoP structure is IPPP structure (that is, a picture structure in which a bit stream is composed of one I frame and continuous P frames), the bit stream generating unit 230 gives up arranging the frames on the basis of I frame when the I frame is not reached during a period of time for bit streams of all the images, but attempts to arrange on the basis of P frame. In the arrangement on the basis of P frame, the bit stream generating unit 230 gives up I frame and acquires P frame in bit stream of each image, and forms n tiles. Even in this case, P-frames on the same location in the order of the GOP structure are aligned with each other.

In the case that the GoP structure of bit stream repeats the same pattern, the bit stream generating unit 230, the bit streams for all the channels are arranged on the basis of I-frame on the same location in the order of the GOP structure, or on the basis of B-frames on the same location in the order of the GOP structure, or on the basis of P-frames on the same location in the order of the GOP structure, thereby generating a combined bit stream.

If or when a screen configuration to be displayed does not form a rectangle as selection of n tiles, for example, a video stream is not selected corresponding to tile 490, the image information extracting unit 220 further receives predetermined specific image information as a video stream corresponding to a tile coincided with the specific location of display picture from a image server, or receives an advertisement image stored in the apparatus 110, and then extracts image information including individual image code and individual header information from the individual video stream of images such as the advertisement image, etc.

The bit stream generating unit 230 receives the image information including the individual image code and the individual header information from the image information extracting unit 220, and generates a combined video stream to display the advertisement image on a location of the tile 490. In some cases, the corresponding area of the tile is such that black screen (black image) is displayed as a screen having no service.

The bit stream generating unit 230 receives an encoded advertisement image or a black image, but encode and provide advertisement image or black image to fit the size of screen using an advertisement image stored in the apparatus 110, black image data, etc. Further, the bit stream generating unit 230 requests the advertisement image or a black image fit for the size to the image server, and receive it from the image server.

Meanwhile, if or when the image information extracting unit 220 receives the advertisement image stored in the apparatus 110, the image information extracting unit 220 selectively receives the advertisement image which has a plurality of samples in the width direction and the height direction respectively, corresponding to the size of tile on location to be displayed.

As shown in FIG. 3, the number indicated on each CTB within tiles represents the order to be decoded when receiving and decoding a combined video stream by the user terminals 120, 130, and 140.

The bit stream generating unit 230 sequentially generates bit streams of images from the tiles of the row which is located at the top of the display image to the tiles of row which is located at the bottom of the display image.

The image is a 3×3 matrix form including a total of 9 tiles 410, 420, 430, 440, 450, 460, 470, 480 and 490. In FIG. 3, each of the tiles 410, 420, 430, 440, 450, 460, 470, 480 and 490 is divided by bold line. Each of the tiles 410, 420, 430, 440, 450, 460, 470, 480 and 490 is equal or different in size.

Each of the tiles 410, 420, 430, 440, 450, 460, 470, 480 and 490 includes a plurality of CTB (Coding Tree Block), and the number of CTB included in each of the tiles 410, 420, 430, 440, 450, 460, 470, 480 and 490 is equal or different in size.

The first tile 410 is composed of 12 CTBs, and the order of scanning is set to be the same as number indicated on each CTB. That is, the order of scanning for display is set to be CTB numbers 0, 1, 2, 3, 4, 5, 6, 7, 8, 9, 10, 11 in order.

As described above, the numbers of the tiles and the CTBs are set to specific values, but not limited thereto; the tiles and the CTBs are able to be set to various numbers. Also, although it is set to scan in order from the tiles (or CTBs) of the row which is located at the top of the image to the tiles (or CTBs) of row which is located at the bottom of the image, but not limited thereto, it is set to scan in various orders as well. Further, each tile is also performed to decode in parallel.

Meanwhile, the user terminals 120, 130 and 140 decode the combined video stream via these scanning to produce a display screen. An image displayed on the user terminals is adjusted in the size of input image and aspect ratio of the screen to fit the screen layout of the user terminals. In this case, the tile setting unit 240 checks in advance the size of the screen to be displayed on the user terminals 120, 130, and 140, and sets the size of the tile to be applied to fit the size of the screen to be displayed on the user terminals 120, 130, and 140. Alternatively, within the terminal to be displayed after decoding the combined bit stream, the image corresponding to each tile is resized to a desired size to display to fit the screen layout of the user terminals.

The audio channel selecting unit 250 receives first selection information that selects an individual video stream corresponding to audio signals which a user wants to hear from a plurality of individual video streams, and transmits, to the audio decoding unit 280, the audio stream corresponding to the individual video stream selected from the number of individual video streams according to the received first selection information. The audio decoding unit 280 decodes the received audio stream and outputs the decoded audio. In some cases, the audio stream selected in the audio channel selecting unit 250 is transmitted to the bit stream generating unit 230, and synchronized with the combined video stream for output.

The bit stream generating unit 230 synchronizes the received audio stream with the combined video stream, and transmits the output (i.e., the combined video stream synchronized with the audio stream, hereinafter referred to as "synchronized video and audio streams") to the user terminals 120, 130, 140. The synchronized video and audio streams are outputted after multiplexed by applying MPEG-2 TS or other multiplexing techniques, or outputted after header information of a format including synchronized time information is added to the video stream and audio stream, respectively.

The apparatus 110, as described above, includes the channel selection input unit 260, and further include the following functions.

The bit stream generating unit 230 receives selection information regarding images of a specific channel from the channel selection input unit 260, and generates a bit stream for images of the specific channel selected by the channel selection input unit 260.

The channel selection input unit 260 transmits to the bit stream generating unit 230 user selection information inputted at the user terminals 120, 130, and 140 or a selection information set in the apparatus 110.

Figure 4:
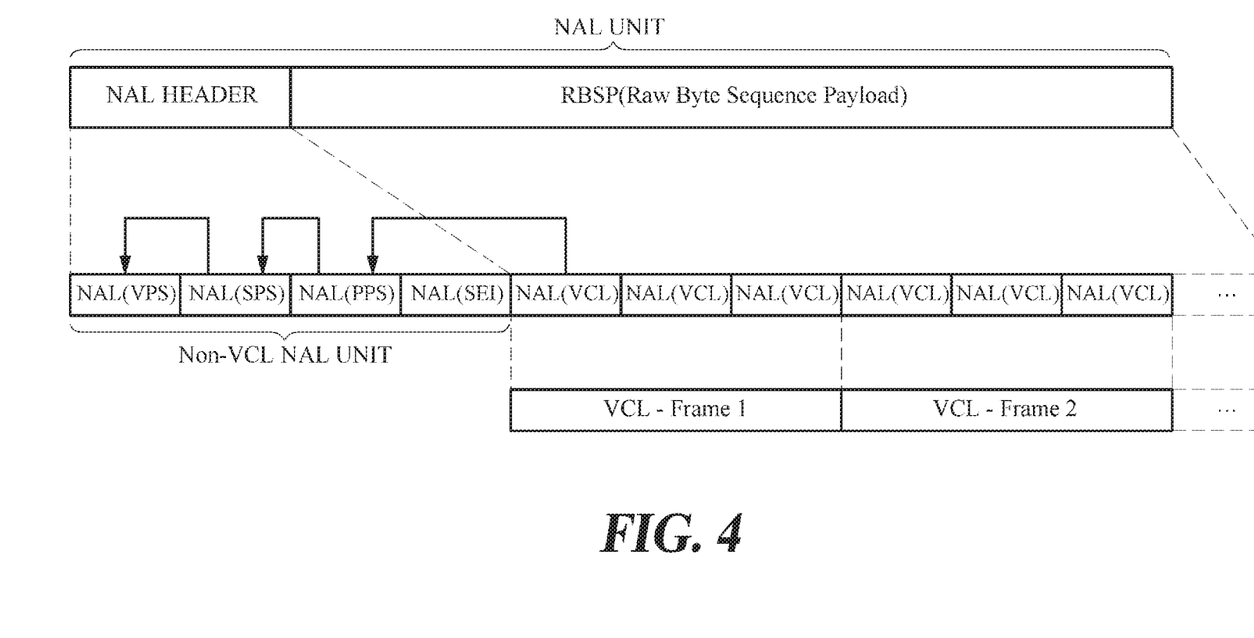
FIG. 4 is a schematic diagram of a NAL unit according to some embodiments of the present disclosure.

FIG. 4 is a schematic diagram of a NAL unit according to some embodiments of the present disclosure. An arrow in FIG. 4 indicates a reference relationship. As shown in FIG. 4, the NAL (Network Abstract Layer) unit includes NAL header and RBSP (Raw Bytes Sequence Payload).

Table 1 shows a syntax regarding an SPS (Sequence Parameter Set) header.

TABLE 1

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( sps_max_sub_layers_minus1 ) | |
|   sps_seq_parameter_set_id | ue(v) |

TABLE 1-continued

| | Descriptor |
|---|---|
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for ( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   log2_min_luma_coding_block_size_minus3 | ue(v) |
|   log2_diff_max_min_luma_coding_block_size | ue(v) |
|   log2_min_transform_block_size_minus2 | ue(v) |
|   log2_diff_max_min_transform_block_size | ue(v) |
|   max_transform_hierarchy_depth_inter | ue(v) |
|   max_transform_hierarchy_depth_intra | ue(v) |
|   scaling_list_enabled_flag | u(1) |
|   if( scaling_list_enabled_flag ) | |
|     sps_scaling_list_data_present_flag | u(1) |
|     if( sps_scaling_list_data_present_flag ) | |
|       scaling_list_data( ) | |
|   } | |
|   amp_enabled_flag | u(1) |
|   sample_adaptive_offset_enabled_flag | u(1) |
|   pcm_enabled_flag | u(1) |
|   if( pcm_enabled_flag ) | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
|   } | |
|   num_short_term_ref_pic_sets | ue(v) |
|   for( i = 0; i < num_short_term_ref_pic_sets; i++) | |
|     short_term_ref_pic_set( i ) | |
|   long_term_ref_pics_present_flag | u(1) |
|   if( long_term_ref_pics_present_flag ) | |
|     num_long_term_ref_pics_sps | ue(v) |
|     for( i = 0; i < num_long_term_ref_pics_sps;i++ ) | |
|       lt_ref_pic_poc_lsb_sps[ i ] | u(v) |
|       used_by_curr_pic_lt_sps_flag[ i ] | u(1) |
|     } | |
|   } | |
|   sps_temporal_mvp_enabled_flag | u(1) |
|   strong_intra_smoothing_enabled_flag | u(1) |
|   vui_parameters_present_flag | u(1) |
|   if( vui_parameters_present_flag ) | |
|     vui_parameters( ) | |
|   sps_extension_present_flag | u(1) |
|   if( sps_extension_present_flag ) { | |
|     for( i = 0; i < 1; i++ ) | |
|       sps_extension_flag[ i ] | u(1) |
|     sps_extension_7bits | u(7) |
|     if( sps_extension_flag[ 0 ] ) { | |
|       transform_skip_rotation_enabled_flag | u(1) |
|       transform_skip_context_enabled_flag | u(1) |
|       intra_block_copy_enabled_flag | u(1) |
|       implicit_rdpcm_enabled_flag | u(1) |
|       explicit_rdpcm_enabled_flag | u(1) |
|       extended_precision_processing_flag | u(1) |
|       intra_smoothing_disabled_flag | u(1) |
|       high_precision_offsets_enabled_flag | u(1) |

TABLE 1-continued

| | Descriptor |
|---|---|
|       fast_rice_adaptation_enabled_flag | u(1) |
|       cabac_bypass_alignment_enabled_flag | u(1) |
|     } | |
|     if( sps_extension_7bits ) | |
|       while( more_rbsp_data( ) ) | |
|         sps_extension_data_flag | u(1) |
|   } | |
|   rbsp_trailing_bits( ) | |
| } | |

Table 2 shows a syntax regarding a PPS (Picture Parameter Set) header.

TABLE 2

| | Descriptor |
|---|---|
| pic_parameter_set_rbsp( ) { | |
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   num_extra_slice_header_bits | u(3) |
|   sign_data_hiding_enabled_flag | u(1) |
|   cabac_init_present_flag | u(1) |
|   num_ref_idx_l0_default_active_minus1 | ue(v) |
|   num_ref_idx_l1_default_active_minus1 | ue(v) |
|   init_qp_minus26 | se(v) |
|   constrained_intra_pred_flag | u(1) |
|   transform_skip_enabled_flag | u(1) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   transquant_bypass_enabled_flag | u(1) |
|   tiles_enabled_flag | u(1) |
|   entropy_coding_sync_enabled_flag | u(1) |
|   if( tiles_enabled_flag) | |
|     num_tile_columns_minus1 | ue(v) |
|     num_tile_rows_minus1 | ue(v) |
|     uniform_spacing_flag | u(1) |
|     if( !uniform_spacing_flag ) | |
|       for( i = 0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |
|     loop_filter_across_tiles_enabled_flag | u(1) |
|   } | |
|   pps_loop_filter_across_slices_enabled_flag | u(1) |
|   deblocking_filter_control_present_flag | u(1) |
|   if( deblocking_filter_control_present_flag ) | |
|     deblocking_filter_override_enabled_flag | u(1) |
|     pps_deblocking_filter_disabled_flag | u(1) |
|     if( !pps_deblocking_filter_disabled_flag ) | |
|       pps_beta_offset_div2 | se(v) |
|       pps_tc_offset_div2 | se(v) |
|     } | |
|   } | |
|   pps_scaling_list_data_present_flag | u(1) |
|   if( pps_scaling_list_data_present_flag ) | |
|     scaling_list_data( ) | |
|   lists_modification_present_flag | u(1) |
|   log2_parallel_merge_level_minus2 | ue(v) |
|   slice_segment_header_extension_present_flag | u(1) |
|   pps_extension_present_flag | u(1) |
|   if( pps_extension_present_flag ) | |
|     for( i = 0; i < 1; i++ ) | |
|       pps_extension_flag[ i ] | u(1) |
|     pps_extension_7bits | u(7) |
|   } | |
|   if( pps_extension_flag[ 0 ] ) | |
|     if( transform_skip_enabled_flag ) | |
|       log2_max_transform_skip_block_size_minus2 | ue(v) |
|     cross_component_prediction_enabled_flag | u(1) |
|     chroma_qp_adjustment_enabled_flag | u(1) |
|     if( chroma_qp_adjustment_enabled_flag ) | |
|       diff_cu_chroma_qp_adjustment_depth | ue(v) |
|       chroma_qp_adjustment_table_size_minus1 | ue(v) |
|       For ( i = 0; i <= chroma_qp_adjustment_table_size_minus1; i++ ) { | |
|         cb_qp_adjustment[ i ] | se(v) |
|         cr_qp_adjustment[ i ] | se(v) |
|       } | |
|     } | |
|     log2_sao_offset_scale_luma | ue(v) |
|     log2_sao_offset_scale_chroma | ue(v) |
|   } | |
|   if ( pps_extension_7bits ) | |
|     while ( more_rbsp_data( ) ) | |
|       pps_extension_data_flag | u(1) |
|   rbsp_trailing_bits( ) | |
| } | |

Table 3 shows a syntax regarding a slice header.

TABLE 3

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) | |
|     for( i = 0; i < num_extra_slice_header_bits; i++ ) | |
|       slice_reserved_flag[ i ] | u(1) |
|     slice_type | ue(v) |
|     if( output_flag_present_flag ) | |

TABLE 3-continued

| | Descriptor |
|---|---|
|     pic_output_flag | u(1) |
|     if( separate_colour_plane_flag == 1 ) | |
|       colour_plane_id | u(2) |
|     if ( nal_unit_type != IDR_W_RADL && nal_unit_type != IDR_N_LP ) | |
|       slice_pic_order_cnt_lsb | u(v) |
|       short_term_ref_pic_set_sps_flag | u(1) |
|       if ( !short_term_ref_pic_set_sps_flag ) | |
|         short_term_ref_pic_set( num_short_term_ref_pic_sets ) | |
|       else if ( num_short_term_ref_pic_sets > 1 ) | |
|         short_term_ref_pic_set_idx | u(v) |
|     if ( long_term_ref_pics_present_flag ) | |
|       if ( num_long_term_ref_pics_sps > 0 ) | |
|         num_long_term_sps | ue(v) |
|       num_long_term_pics | ue(v) |
|       for( i = 0; i < num_long_term_sps + num_long_term_pics; i++ ) { | |
|         if ( i < num_long_term_sps ) { | |
|           if ( num_long_term_ref_pics_sps > 1 ) | |
|             lt_idx_sps[ i ] | u(v) |
|         } else { | |
|           poc_lsb_lt[ i ] | u(v) |
|           used_by_curr_pic_lt_flag[ i ] | u(1) |
|         } | |
|         delta_poc_msb_present_flag[ i ] | u(1) |
|         if ( delta_poc_msb_present_flag[ i ] ) | |
|           delta_poc_msb_cycle_lt[ i ] | ue(v) |
|       } | |
|     } | |
|     if( sps_temporal_mvp_enabled_flag ) | |
|       slice_temporal_mvp_enabled_flag | u(1) |
|   } | |
|   if( sample_adaptive_offset_enabled_flag ) { | |
|     slice_sao_luma_flag | u(1) |
|     if ( ChromaArrayType != 0 ) | |
|       slice_sao_chroma_flag | u(1) |
|   } | |
|   if( slice_type == P \|\| slice_type == B ) | |
|     num_ref_idx_active_override_flag | u(1) |
|     if( num_ref_idx_active_override_flag ) | |
|       num_ref_idx_l0_active_minus1 | ue(v) |
|       if( slice_type == B ) | |
|         num_ref_idx_l1_active_minus1 | ue(v) |
|   } | |
|   if( lists_modification_present_flag && NumPocTotalCurr > 1 ) | |
|     ref_pic_lists_modification( ) | |
|   if( slice_type == B) | |
|     mvd_l1_zero_flag | u(1) |
|   if( cabac_init_present_flag ) | |
|     cabac_init_flag | u(1) |
|   if( slice_temporal_mvp_enabled_flag) { | |
|     if( slice_type == B ) | |
|       collocated_from_l0_flag | u(1) |
|     if( ( collocated_from_l0_flag && num_ref_idx_l0_active_minus1 > 0 ) \|\| ( !collocated_from_l0_flag && num_ref_idx_l1_active_minus1 > 0 ) ) | |
|       collocated_ref_idx | ue(v) |
|   } | |
|     if( ( weighted_pred_flag && slice_type == P) \|\| ( weighted_bipred_flag && slice_type == B ) ) | |
|       pred_weight_table( ) | |
|     five_minus_max_num_merge_cand | ue(v) |
|   } | |
|   slice_qp_delta | se(v) |
|   if( pps_slice_chroma_qp_offsets_present_flag ) | |
|     slice_cb_qp_offset | se(v) |
|     slice_cr_qp_offset | se(v) |
|   } | |
|   if ( chroma_qp_adjustment_enabled_flag ) | |
|     slice_chroma_qp_adjustment_enabled_flag | u(1) |
|   if ( deblocking_filter_override_enabled_flag ) | |
|     deblocking_filter_override_flag | u(1) |

TABLE 3-continued

| | Descriptor |
|---|---|
| ​            if ( deblocking_filter_override_flag ) | |
| ​                slice_deblocking_filter_disabled_flag | u(1) |
| ​                if ( !slice_deblocking_filter_disabled_flag ) | |
| ​                    slice_beta_offset_div2 | se(v) |
| ​                    slice_tc_offset_div2 | se(v) |
| ​                } | |
| ​            } | |
| ​                    if( pps_loop_filter_across_slices_enabled_flag && | |
| ​                        ( slice_sao_luma_flag \|\| slice_sao_chroma_flag \|\| | |
| ​                            !slice_deblocking_filter_disabled_flag ) ) | |
| ​                        slice_loop_filter_across_slices_enabled_flag | u(1) |
| ​            } | |
| ​            if ( tiles_enabled_flag \|\| entropy_coding_sync_enabled_flag ) { | |
| ​                num_entry_point_offsets | ue(v) |
| ​                if( num_entry_point_offsets > 0 ) | |
| ​                    offset_len_minus1 | ue(v) |
| ​                    for ( i = 0; i < num_entry_point_offsets; i++ ) | |
| ​                        entry_point_offset_minus1[ i ] | u(v) |
| ​                } | |
| ​            } | |
| ​            if( slice_segment_header_extension_present_flag ) { | |
| ​                slice_segment_header_extension_length | ue(v) |
| ​                for (i = 0; i < slice_segment_header_extension_length; i++) | |
| ​                    slice_segment_header_extension_data_byte[ i ] | u(8) |
| ​            } | |
| ​            byte_aligmnent( ) | |
| } | |

Table 4 shows Data Syntax of General slice segment.

TABLE 4

| | Descriptor |
|---|---|
| slice_segment_data( ) { | |
| ​    do { | |
| ​        coding_tree_unit( ) | |
| ​        end_of_slice_segment_flag | ae(v) |
| ​        CtbAddrInTs++ | |
| ​        CtbAddrInRs = CtbAddrTsToRs[ CtbAddrInTs ] | |
| ​            if( !end_of_slice_segment_flag && | |
| ​                ( ( tiles_enabled_flag && | |
| TileId[ CtbAddrInTs ] != TileId[ CtbAddrInTs − 1 ] ) \|\| | |
| ​                    ( entropy_coding_sync_enabled_flag && | |
| CtbAddrInTs % PicWidtInCtbsY = = 0 ) ) | |
| ​                    ) { | |
| ​                        end_of_sub_steam_one_bit /* equal to 1 */ | ae(v) |
| ​                        byte_alignment( ) | |
| ​                } | |
| ​    } while( !end_of_slice_segment_flag ) | |
| } | |

The bit stream for encoded individual images is transmitted by NAL (Network Abstract Layer) unit which is a unit of NAL. NAL header of the NAL unit includes Non-VCL (Non-Video Coding Unit) NAL unit and VCL NAL. The Non-VCL NAL unit includes NAL (VPS) meaning VPS (Video parameter Set) NAL, NAL (SPS) meaning SPS (Sequence Parameter Set) NAL, NAL (PPS) meaning PPS (Picture Parameter Set) NAL, and NAL (SEI) meaning SEI (Supplemental Enhancement Information) NAL. In particular, SPS includes ON/OFF information of encoding tool, and PPS includes information regarding tile. In some embodiments of the present disclosure, the bit stream generating unit 230 generates a single bit stream for multiple images by modifying SPS information, PPS information, and the like, of the header to be converted to tile structure in order to process the images according to the specification of decoder.

VCL NAL unit includes a plurality of frames such as first frame (Frame 1), second frame (Frame 2), and the like. Each frame includes three consecutive NALs (VCL).

In the combined video stream, information regarding tile is set in PPS. For example, tiles_enabled_flag, which is information set in PPS, is information indicating whether or not a tile structure presents in picture.

In the combined video stream, the size of each tile is set using num_tile_columns_minus1, num_tile_rows_minus1, and uniform_spacing_flag.

The num_tile_columns_minus1 indicates the number of tiles in width direction; the num_tile_rows_minus1 indicates the number of tiles in height direction. The uniform_spacing_flag is information indicating whether or not all the sizes of tiles are the same.

In the case that all the sizes of the tiles are the same, the sizes of the tiles are verified by referring to num_tile_columns_minus1 and num_tile_rows_minus1. In the case that the sizes of the tiles are not the same, each transverse size of tiles is set in column_width_minus1 [i], and each longitudinal size of tiles is set in row_height_minus1 [i].

Meanwhile, the respective individual video streams have some constraints in order to generate the combined video stream.

For example, the individual header information of all the individual video streams includes information indicating that it is disabled to perform loop filtering across the boundaries of slice (for example, loop_filter_across_tiles_enabled_flag=0). When the individual video streams encoded under the limiting condition are combined together to generate a combined video stream, it is possible to prevent the image quality from being degraded in the boundaries of tiles because the loop filtering does not occur at the boundaries of tiles. In the case, one tile corresponding to one individual video stream is composed of one slice. In some cases, the one tile includes a plurality of slices.

In the case that encoding is a motion vector coding mode such as Merge, Mergeskip, etc., in prediction unit, an individual video stream is encoded such that padded parts exceeding the range of image in the individual video stream are not referred to in motion vector. Thus, when calculating the motion vector with a mode such as Merge, Mergeskip, etc., it is prevented from referring to the motion information exceeding the boundaries of tile in order to determine a motion vector candidate.

Further, when estimating the motion of prediction unit in encoding, an individual video stream is encoded such that the range of the motion estimation does not exceed the padded parts. Even in this case, when decoding the combined video stream, it is prevented from predicting the motion exceeding the boundaries of tiles.

Further, in encoding process before the individual video stream is inputted to the apparatus 110, the individual header information includes information indicating that it is disabled to refer to motion vector (Temporal motion vector) of other picture which present in the same location as current encoding block in prediction unit when encoding motion vector in the prediction unit. When any one of individual video streams refers to the Temporal motion vector for prediction, it is required to wait for subsequent other picture and to buffer data for longer than necessary. Thus, by setting not to refer to the Temporal motion vector, the delay for synchronization of each individual video stream is reduced, thereby preventing the degradation in decoding performance of entire combined video stream.

In generation of SPS, PPS, slice header information, etc., corresponding to the combined video stream, the header information of the combined video stream is modified different from the header information of other individual video streams in information below.

The sizes of combined image in width direction and height direction are set in SPS by changing pic_width_in_luma_samples and pic_width_in_luma_samples to the size of image screen to be combined.

Table 5 shows the changed values in NAL headers of individual video stream and combined video stream by comparing them. In particular, Table 5 shows parameters set in PPS.

TABLE 5

| Syntax field | Value before change (individual video stream) | Value after change (combined video stream) |
|---|---|---|
| tiles_enabled_flag | 0 | 1 |
| num_tile_columns_minus1 | None | The number of tiles in height direction |
| num_tile_rows_minus1 | None | The number of tiles in width direction |
| loop_filter_across_tiles_enabled_flag | None | 0 |

Meanwhile, each individual video stream is divided by CTU unit to be merged into tiles.

It is set that one slice is assigned to one individual video stream (one tile) constituting a combined video stream by receiving encoding information of the individual video stream of which individual header information includes information for enabling tile structure not to be allowed. If not, to parse entire bit stream of image is occurred or required in order to modify the values of end_of_slice_segment_flag, end_of_sub_stream_one_bit.

The combined header information of combined video stream includes information of first_slice_segment_in_pic_flag indicating only whether or not its first slice header is first slice in picture. When indicating the first slice header is first slice in entire picture of the combined video stream, first_slice_segment_in_pic_flag is set to 1, and for the remainder, first_slice_segment_in_pic_flag=0 is set as meaning that they are not the first slide. Further, location of each slice is reset for entire picture by setting slice_segment_address. The slice_segment_address of slice in each tile is used as an address for indicating the absolute location of fully combined image of first CTU in slice. That is, in combined entire picture, the order of first CTU of slice included in each tile is set to slice_segment_address. This order is the order of CTU corresponding to sequential scan (raster scan) order in the combined entire picture. Further, in all the slice headers, num_entry_point_offsets meaning offset of tile in slice is set to 0.

The image information extracting unit 220 parses individual video stream. If or when a predetermined type of second byte string is parsed, the image information extracting unit 220 converts it to first byte string to produce a combined video stream. For example, in individual video stream, in the case that four bytes 00 00 03 00 to 00 00 03 03 of hexacode are parsed, third byte 03 is eliminated and the 00 00 03 00 to 00 00 03 03 are converted to preset 3 bytes of first byte string (for example, 00 00 00 to 00 00 03).

In the process that the bit stream generating unit 230 generates combined video stream, in the case of scanning the combined video stream and finding three bytes of first code byte string (for example, 00 00 00), the bit stream generating unit 230 adds hexacode 0x03 between second byte and third byte, and converts the found three bytes to preset 4 bytes of second byte string (for example, 00 00 03 00) to output the combined video stream.

Figure 5:
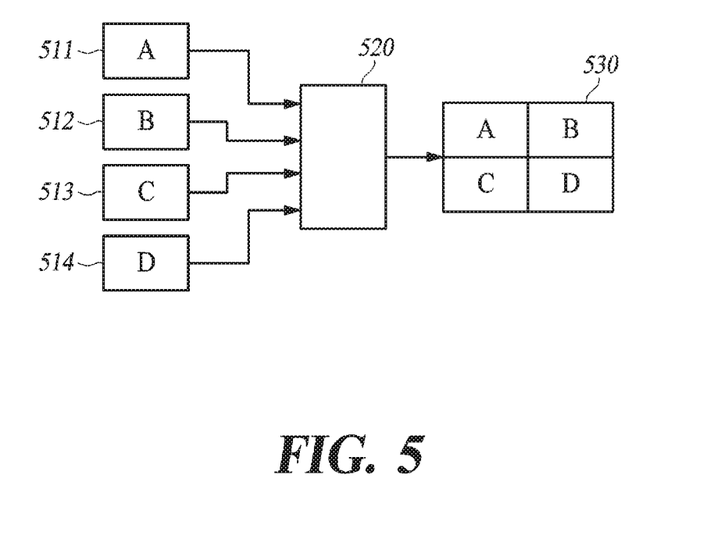
FIG. 5 is a schematic diagram of describing a synchronization function of a multi-bit stream according to some embodiments of the present disclosure.

FIG. 5 is a schematic diagram for describing a synchronization function of a multi-bit stream according to some embodiments of the present disclosure. As shown in FIG. 5, there are shown first to fourth cameras (511, 512, 513, and 514), a bit stream generation apparatus 520, and a user terminal 530.

In FIG. 5, images A, B, C, and D of various views in a soccer field taken by the first to fourth cameras 511, 512, 513, 514 are provided. The bit stream generation apparatus 520 receives the images each taken by the cameras, generates a combined image (A, B, C, and D) and the combined image to the user terminal 530.

When the user terminal 530 selects a specific channel to request multi-view service, the bit stream generation apparatus 520 performs call setup by, in advance, sharing the number of image bit streams outputted from standby cameras, GoP (Group of Picture) information (for example, Closed GoP or not, the number of GoPs, resolution) etc. When call setup between the bit stream generation apparatus 520 and the user terminal 530 is completed, the bit stream generation apparatus 520 will transmit bit stream to the user terminal 530. Before transmitting the bit stream, the bit stream generation apparatus 520 synchronizes the images from the cameras using transmission time of transmission specification, payload type information indicating characteristics of frame and GoP information to decode corresponding frames. The bit stream generation apparatus 520 synchronizes the images by fitting the images via buffering of each transmitted bit stream or eliminating some frames of non-synchronized frames when the payload type exceeds a threshold delay value.

The bit stream generation apparatus 520 converts individual bit stream of each image transmitted through the first to fourth cameras 511, 512, 513, and 514 to a tile structure, and provides one combined image to the user terminal 530. For example, in the case that all the image sizes on the terminal 530 corresponding to individual bit streams are same, the individual images are arranged on the terminal by fitting their image sizes to the size of the terminal image which is twice the individual image in transverse and height directions respectively.

Further, if or when resolution adjustment of the provided bit stream is possible, the bit stream generation apparatus 520 generates bit stream with a required resolution and adjust the bit stream to fit it to the size of the user terminal 530. To this end, the bit stream generation apparatus 520 combines a sequence of bit streams and provides a set tile structure to simultaneously decode a plurality of images depending on the order of images according to the tile structure and decoding structure.

When various image bit streams are combined to be suitable for tile structure, the resolution adjustment is required. In the first method to this end, the image requesting unit 290 in the bit stream generation apparatus 520 requests an image of the size corresponding to the resolution to an image server or an image generation terminal, receives the image from the image server or the image generation terminal, and encodes the image to a desired display size to transmit the encoded bit stream.

In the second method, when the image of the requested size is not provided from the image server or the image generation terminal, the image requesting unit 290 requests images of a size similar to the size to be displayed to the image server or the image generation terminal, and receives bit streams corresponding to respective tiles. The bit stream generation apparatus 520 then generates and outputs a combined bit stream by combining the plurality of bit streams, and a terminal receiving the combined bit stream resizes the images of respective tiles to the resolution of a desired size and outputs the resized images.

For example, since the tile of first camera 511 comes first in the order of scanning, it is combined in a form such as $n^{th}$ frame of the first camera 511, $n^{th}$ frame of second camera 512, $n^{th}$ frame of third camera 513, $n^{th}$ frame of fourth camera 514, $n+1^{th}$ frame of the first camera 511, $n+1^{th}$ frame of second camera 512, $n+1^{th}$ frame of third camera 513, $n+1^{th}$ frame of fourth camera 514.

Figure 6:
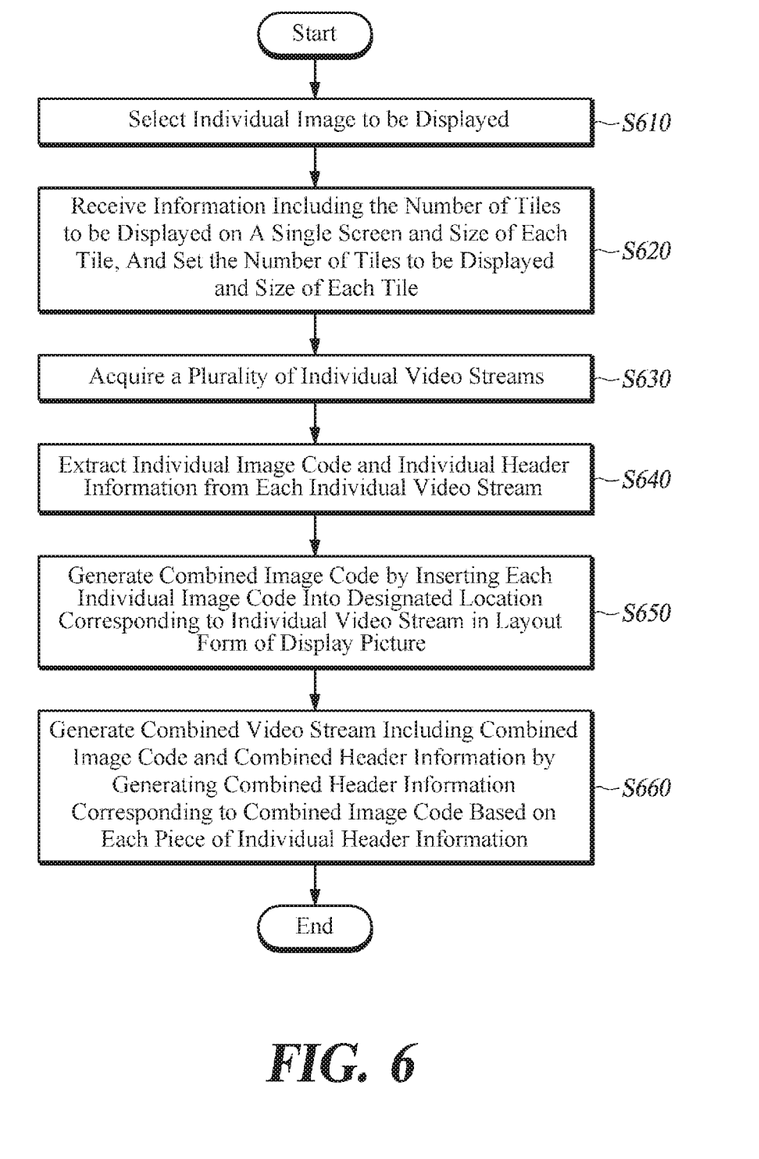
FIG. 6 is a flowchart of a method for generating a combined video stream of multiple images according to some embodiments of the present disclosure.

FIG. 6 is a flowchart of a method of generating a combined video stream of multiple images according to some embodiments of the present disclosure.

The method for generating a combined video stream according to some embodiments of the present disclosure includes the steps of: selecting individual images to be displayed (Step S610); receiving the information regarding the number of tiles to be displayed on a screen and the size of each tile, and setting the number of tiles to be displayed on a screen and the size of each tile (Step S620); acquiring a plurality of individual video streams (Step S630); extracting individual image code and individual header information from the acquired individual video stream (Step S640); generating a combined image code by inserting each individual image code into a designated location (i.e., corresponding respective position) corresponding to the each individual video stream in a predetermined layout of display picture (Step S650); and generating a combined header information corresponding to the combined image code using each individual header information to generate a combined video stream including the combined image code and the combined header information (Step S660).

The step of channel selection (Step S610), the step of tile setting (Step S620), the step of image acquisition (Step S630), and the step of image information extraction (Step S640) correspond to the operations of the channel selection input unit 260, the tile setting unit 240, the image acquiring unit 210, and the image information extracting unit 220, respectively. Further, the step of combined image code generation (Step S650) and the step of combined video stream generation (Step S660) correspond to operation of the bit stream generating unit 230. Thus, the detailed description of each element as described above with reference to FIGS. 1 thru 5 is also applicable, and incorporated herein, to the description of FIG. 6.

Although FIG. 6 shows that Steps S610 to S640 are performed sequentially, this is only an exemplary embodiment of the technical idea of the present disclosure, not limited thereto, as well. That is, various changes and modifications are made by one ordinarily skilled in the art within some embodiments of the present disclosure without departing from the scope and spirit of the claimed invention as disclosed in the accompanying claims, such as changing the order described in FIG. 6, performing one or more of Steps S610 to S640 in parallel, and the like. Thus, FIG. 6 is not limited to the chronological order.

According to some embodiments of the present disclosure as described above, some embodiments of the present disclosure are responsive to bit streams of a plurality of input images through multiple channels for providing one combined screen image of updates of the bit streams and information of the respective bit stream headers without performing a transcoding.

In the description above, although all of the components of the embodiments of the present disclosure have been explained as assembled or operatively connected as a unit, the present disclosure is not intended to limit itself to such embodiments. Rather, within the objective scope of the claimed invention, the respective components is able to be selectively and operatively combined in any numbers. Every one of the components is also implemented by itself in hardware while the respective ones can be combined in part or as a whole selectively and implemented in a computer program having program modules for executing functions of the hardware equivalents. Codes or code segments to constitute such a program is easily deduced by a person skilled in the art. The computer program is stored in non-transitory computer readable recording medium, which in operation can realize some embodiments of the present disclosure. Examples of the non-transitory computer readable recording medium include magnetic recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

Although exemplary embodiments of the present disclosure have been described for illustrative purposes, those skilled in the art will appreciate that various modifications, additions and substitutions are possible, without departing from the scope and spirit of the claimed invention as disclosed in the accompanying claims. Specific terms used in this disclosure and drawings are used for illustrative purposes and not to be considered as limitations of the present disclosure. Therefore, exemplary embodiments of the present disclosure have been described for the sake of brevity and clarity. Accordingly, the scope of the claimed invention construed as defined in the following claims and changes, modifications and equivalents that fall within the technical idea of the present disclosure are intended to be embraced by the claimed invention.

What is claimed is:

1. An apparatus of generating a combined video stream of multiple images, the apparatus comprising:
   an image acquiring unit, implemented by one or more processors, configured to acquire a plurality of individual video streams transmitted over multiple channels;
   an image information extracting unit, implemented by one or more processors, configured to extract individual image codes and individual header information from each of the plurality of the individual video streams; and
   a bit stream generating unit, implemented by one or more processors, configured to
      generate a combined image code including the extracted individual image codes arranged as tiles in the combined image code,
      generate combined header information corresponding to the combined image codes based on the extracted individual header information, and
      generate a combined video stream including the combined image codes and the combined header information, the combined video stream having a predetermined layout of a display picture.

2. The apparatus of claim 1, further comprising an audio decoding unit, implemented by one or more processors, configured to
   receive a first selection information, and
   decode an audio stream corresponding to one of the plurality of individual video streams based on the first selection information.

3. The apparatus of claim 1, wherein the combined header information include an information indicating that the combined video stream includes a plurality of tiles.

4. The apparatus of claim 1, wherein the individual header information include an information indicating an inability to perform a loop filtering across a boundary of slices.

5. The apparatus of claim 3, wherein the tile includes one or more slices.

6. The apparatus of claim 1, wherein
   when a predetermined byte string is parsed in respective individual video streams when parsing the respective individual video streams, the predetermined byte string having been parsed is converted to a first byte string for generating the combined video stream, and
   when the first byte string is found when scanning the combined video stream, the first byte string having been found is converted to the predetermined byte string.

7. The apparatus of claim 1, wherein the individual header information includes an information indicating an inability, when encoding a motion vector in unit of prediction, to refer to another motion vector of other picture collocated with a current encoding block in the unit of prediction.

8. The apparatus of claim 1, wherein the bit stream generating unit is configured to receive a selection information of a user to determine a size of each tile.

9. The apparatus of claim 1, wherein the bit stream generating unit is configured to
   receive a selection information of a user, and
   select a screen configuration of the display picture including a plurality of tiles.

10. The apparatus of claim 9, wherein, when the screen configuration forms no rectangle by selecting the a plurality of tiles, the bit stream generating unit is configured to receive a predetermined specific image information as a video stream corresponding to a tile coincided with a specific position in the display picture to allow the screen configuration to be formed as a rectangle.

11. The apparatus of claim 3, wherein
   a number of samples in a width direction of any one of the tiles is same as the number of samples in a width direction of a tile adjacent vertically thereto, and
   the number of samples in a height direction of any one of the tiles is same as the number of samples in a height direction of a tile adjacent horizontally thereto.

12. The apparatus of claim 3, wherein the combined header information include an information indicating a number of the tiles arranged in a width direction and an information indicating the number of the tiles arranged in a height direction in the predetermined layout.

13. A method performed by an apparatus of generating a combined video stream of multiple images, the apparatus including one or more processors to execute the method comprising:
   acquiring a plurality of individual video streams transmitted over multiple channels;
   extracting individual image codes and individual header information from each of the plurality of the individual video streams;
   generating a combined image code including the extracted individual image codes arranged as tiles in the combined image code;
   generating combined header information corresponding to the combined image codes based on the extracted individual header information; and
   generating a combined video stream including the combined image codes and the combined header information, the combined video stream having a predetermined layout of a display picture.

14. The method of claim 13, wherein the combined header information include an information indicating that the combined video stream includes a plurality of tiles.

15. The method of claim 13, wherein the individual header information include an information indicating an inability to perform a loop filtering across a boundary of slices.

16. The method of claim 13, wherein
   when a predetermined byte string is parsed in respective individual video streams when parsing the respective individual video streams, the predetermined byte string having been parsed is converted to a first byte string for generating the combined video stream, and
   when the first byte string is found when scanning the combined video stream, the first byte string having been found is converted to the predetermined byte string.

17. The method of claim 13, wherein the individual header information include an information indicating an inability, when encoding a motion vector in unit of prediction, to refer to another motion vector of other picture collocated with a current encoding block in the unit of prediction.

18. The method of claim 14, wherein the combined header information include an information indicating the number of the tiles arranged in a width direction and an information indicating the number of the tiles arranged in a height direction in the predetermined layout.

19. An apparatus of generating a combined video stream of multiple images, the apparatus comprising:
- an image acquiring unit, implemented by one or more processors, configured to acquire a plurality of individual video streams transmitted over multiple channels;
- an image information extracting unit, implemented by one or more processors, configured to extract individual image codes and individual header information from each of the plurality of the individual video streams; and
- a bit stream generating unit, implemented by one or more processors, configured to
  - generate combined image codes by inserting the extracted individual image codes into corresponding respective positions corresponding to each of the plurality of individual video streams in a predetermined layout of a display picture,
  - generate combined header information corresponding to the combined image codes based on the extracted individual header information, and
  - generate a combined video stream including the combined image codes and the combined header information, wherein when a predetermined byte string is parsed in respective individual video streams when parsing the respective individual video streams, the predetermined byte string having been parsed is converted to a first byte string for generating the combined video stream, and when the first byte string is found when scanning the combined video stream, the first byte string having been found is converted to the predetermined byte string.

* * * * *